United States Patent
Cortequisse et al.

(10) Patent No.: US 8,157,519 B2
(45) Date of Patent: Apr. 17, 2012

(54) CONNECTING SYSTEM

(75) Inventors: Jean-Francois Gerard Jacques Cortequisse, Heers (BE); Sebastien Jean Bernard De Tessieres, Chalagnac (FR)

(73) Assignee: Techspace Aero, Milmort Herstal (BE)

( * ) Notice: Subject to any disclaimer, the term of this patent is extended or adjusted under 35 U.S.C. 154(b) by 1102 days.

(21) Appl. No.: 11/965,225

(22) Filed: Dec. 27, 2007

(65) Prior Publication Data

US 2008/0159860 A1  Jul. 3, 2008

(30) Foreign Application Priority Data

Dec. 27, 2006  (EP) .................................... 06127257

(51) Int. Cl.
*F01D 25/24* (2006.01)
(52) U.S. Cl. .................................................. 415/214.1
(58) Field of Classification Search ............... 415/189, 415/214.1, 232; 285/405, 408, 410
See application file for complete search history.

(56) References Cited

U.S. PATENT DOCUMENTS 4,478,439 A   10/1984  Arnold

FOREIGN PATENT DOCUMENTS

| CH | 273204 | 5/1951 |
|----|--------|--------|
| DE | 4314160 A1 * | 11/1993 |
| EP | 1 106 893 A1 | 6/2001 |
| EP | 1 314 854 A1 | 5/2003 |
| GB | 2 184 186 A | 6/1987 |

OTHER PUBLICATIONS

U.S. Appl. No. 11/964,380, filed Dec. 26, 2007, Lhoest.

* cited by examiner

*Primary Examiner* — Richard Edgar
(74) *Attorney, Agent, or Firm* — Oblon, Spivak, McClelland, Maier & Neustadt, L.L.P.

(57) ABSTRACT

A system for connecting two ferrules of an axial compressor case. A ferrule includes a female flange, while the other ferrule includes a male flange. Both the female flange as well as the male flange are substantially annular and include a proximal face intended to be integral with the ferrule, and a distal face. The male flange is intended to be introduced into a space bound by an axial extension of the female flange. The system further includes a trim intended to be introduced behind the male flange into the space and clamped between the proximal face of the male flange and a surface of the extension substantially opposite in order to space them apart and thus clamp the distal faces of both flanges one against the other.

13 Claims, 2 Drawing Sheets

CONNECTING SYSTEM

The present invention relates to a system for connecting two substantially tubular members, particularly two ferrules of an axial compressor case.

Axial compressors, for example, in turbojets, are generally made of an axial sequence of rotors and stators. Each rotor is a set of rotary blades secured to the driving shaft of the compressor. Each stator is a set of stationary rectifying vanes secured to the compressor case. Each rotor is followed by a stator, so as to form a compressor stage.

A turbojet could comprise a plurality of successive compressors, for example, a low pressure compressor mounted in front of a high pressure compressor, where each comprises a different driving shaft.

Generally, an axial compressor case is formed by a set of substantially tubular members, also called ferrules, successively connected. Each ferrule generally surrounds a compressor stage, i.e. a rotor and a stator. A ferrule will thus normally comprise the set of stationary vanes forming the stator, or means for securing said stationary vanes, as well as a abradable inner surface so as to avoid an excessive friction with the rotor blades.

The pairs of successive ferrules are connected via connecting means comprising
 a) two flanges, each being substantially annular and comprising a proximal face adapted to be integral with one of both successive ferrules and a distal face, and
 b) securing members for pressing the distal faces of both flanges one against the other, so as to be able to transmit tensile and compression axial stresses between both flanges assembled through clamping.

As used herein, distal face means the most remote face of the ferrule body. Proximal face means the nearest one of the ferrule body. In the state of the art, there are used as securing members bolts crossing holes arranged in flanges However, such an arrangement has several inconvenients.

Should one of the compressor vane or blade break, significant circumferential stresses will become added to the axial and radial stresses between the pairs of adjacent ferrules. Such stresses have a shearing effect on the bolts of the connecting system, requiring the use of a large number of bolts with a considerable diameter for connecting ferrules. With the aim to solve the problem of the bulk of bolts, it is necessary to oversize the flanges by increasing the external diameter.

In addition to the cost and weight inconvenients resulting from such an oversizing, the radial bulk of enlarged flanges also results in other problems. Thus, in a large number of applications, such a bulk makes the assembling and disassembling operations difficult, because of interferences between flanges and members outside of the compressor, such as, for example, hoods. More particularly, in the field of turbojets, it could be desirable to be able to disassemble the low pressure compressor at the rear in order to make the maintenance easier. However, if the connecting flanges of the ferrules of the compressor case are too bulky, they will abut against the intermediate case, generally provided at the back of the low pressure compressor and used for supporting the whole turbojet.

This invention has also the object of overcoming the inconvenients of the state of the art providing securing members allowing to minimise the radial bulk of a connecting system of substantially tubular members, and particularly of ferrules in an axial compressor case.

In order to overcome such a problem, this invention provides a connecting system such as described in the opening paragraph, wherein:

first, one of both flanges is a male flange with a determined external diameter, and the other one is a female flange comprising, on the distal face thereof, an axial extension with an internal diameter substantially equal to or higher than the external diameter of the male flange, so that said male flange could be introduced into a space bound by said axial extension of said female flange.

Secondly, said securing means comprise a trim adapted for being introduced behind said male flange in the space bound by said axial extension, and a trim-clamping element for exerting a radial force on said trim.

And thirdly, the trim is arranged so as to be clamped by said radial force between the proximal face of the male flange and a surface of said axial extension substantially opposite to said proximal face of the male flange, so as to convert said radial force into a substantially axial spreading force between said axial extension surface and the proximal face of the male flange, so clamping distal faces of both flanges one against the other.

Such features allow separating tensile axial stresses, which will be transmitted by the trim, from compression axial stresses, which will be transmitted by the flange distal faces, and from circumferential and radial stresses. Such a separation facilitates the design of the various components of the system and their optimised sizing for each of the stresses to be transmitted. Moreover, the trim working section could be very big, likely to occupy substantially all the coupling system circumference, thereby allowing to reduce the flange external diameter.

Preferably, said axial extension further comprises an internal centering surface with a diameter substantially equal to the external diameter of the male flange and preferably adjusted so as to obtain a determined radial clamping, said centering internal surface being intended to cooperate with the male flange when the distal face of the latter is clamped against the distal face of the female flange, so as to limit the radial shift of the male flange relative to the female flange. This provides a simple means for transmitting radial efforts but also having a high efficiency by means of its large working section.

Preferably, said trim comprises a plurality of separated sectors so as to facilitate the insertion thereof into the space bound by the axial extension.

Preferably, the connecting system further comprises positive connection means for ensuring circumferential stresses between the male and female flanges, thereby allowing to ensure an efficient transmission of circumferential stresses between the male and female flanges.

Preferably, said positive connection means comprise a set of locations provided in each of said male and female flanges and a set of keys provided for being housed in such locations. This provides for positive connection means particularly simple to implement and able to be perfectly separated from stresses other than the circumferential ones.

Preferably, said locations provided in each of said male and female flanges are circumferentially distributed with gaps substantially corresponding to lengths of said trim sectors, and each of said trim sectors is intended to be introduced into the space bound by said axial extension between two keys located in said locations. Such an embodiment allows to limit the tangential shift of trim sectors and to well distribute tensile stresses between all trim sectors and circumferential stresses between all keys.

Preferably, said trim-clamping element comprises at least one shoulder for preventing keys from falling, should some loosening or break occur.

Preferably, said trim-clamping element comprises a tapered or tilted surface for cooperating with said trim so as to convert a substantially axial force exerted on said trim-clamping element into a substantially radial force on said trim for clamping the connecting system. This implements a simple means for clamping said trim between said opposite and relatively tilted surfaces for clamping the connecting system.

To further facilitate trim clamping and therefore, clamp the connecting system, said securing members further comprise a threaded stem for connecting said trim-clamping element to a supporting member integral with one of both substantially tubular members, such as the female flange or a third flange, and exert said substantially axial force on said trim-clamping element, such as to clamp the connecting system through rotation of said threaded stem with respect to a complementary thread on the trim-clamping element or the supporting member. As the threaded stem is not provided for transmitting any of the stresses between both flanges, it could be sized with a much smaller section as that of the prior art bolts.

The present invention is also relative to an axial compressor case, for example, of a low pressure compressor of a turbojet or a turboprop, comprising a plurality of ferrules, at least two of which are adjacent and connected by a connecting system according to this invention, as well as a method for using such a connecting system in such a case. This provides an axial compressor case with a low radial bulk and therefore, easier to disassemble.

Preferably, at least one of said both adjacent ferrules comprises a stator and/or an abradable inner surface, so as to integrate such members of the compressor into the case.

Details regarding this invention are described hereinbelow referring to drawings.

Figure 1:
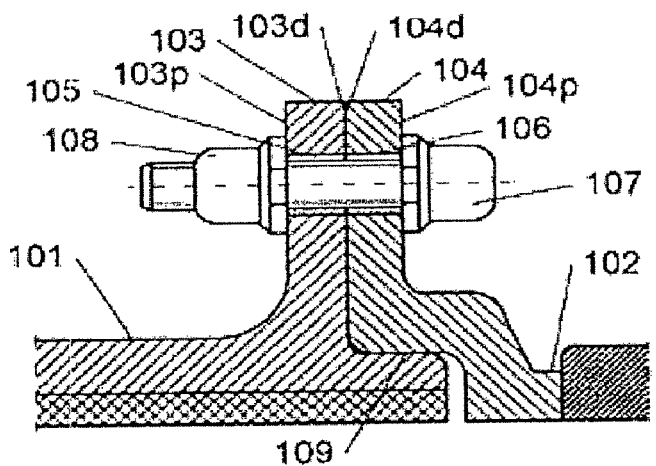
FIG. 1 is a lengthwise sectional view of a connecting system of the state of the art.

As could be seen on FIG. 1, in the state of the art, each of the ferrules 101 and 102 of a low pressure compressor case of a double flow turbojet comprises a flange, respectively designated by 103 and 104. Each of such flanges 103, 104 has a proximal face, respectively designated by 103$p$ and 104$p$, and a distal face, respectively designated by 103$d$ and 104$d$. In each flange, 103, 104, a set of holes, respectively designated by 105 and 106, connect the proximal face 103$p$, 104$p$ to the distal face 103$d$, 104$d$. The holes 105 of the flange 103 are aligned with the holes 106 of the flange 104, so as to be able to have screws 107 pass therethrough. By clamping such screws 107 with nuts 108, it is therefore possible to achieve an axial connection between ferrules 101 and 102.

While the transmission of radial stresses is ensured by the interlocking of centering surfaces 109 of ferrules 101, 102, bolts 107 should ensure, in addition to the axial traction, the circumferential torsion between flanges 103, 104. Such a torsion submits the bolts 107 to shear stresses, requiring their working section to be increased, and therefore the diameter of the holes 105,106 and the height of flanges 103, 104.

Figure 2:
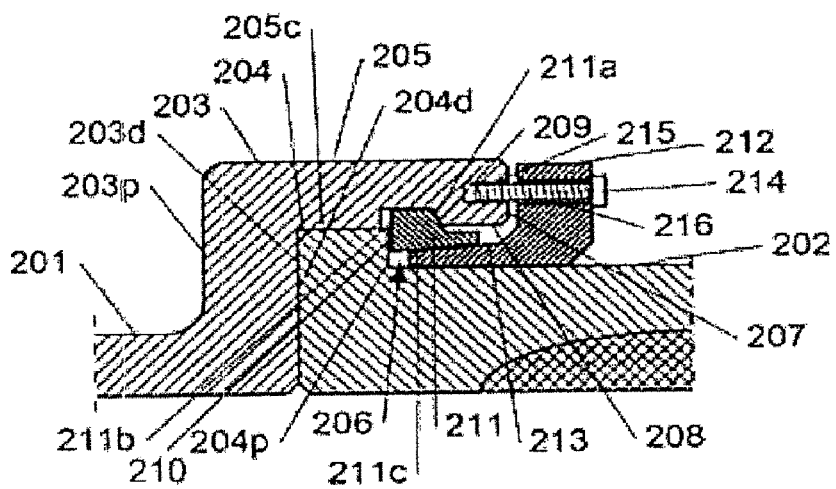
FIG. 2 is a lengthwise sectional view of a connecting system according an embodiment of this invention.

In the embodiment according to this invention, as represented in FIG. 2, the ferrule 201 comprises a female flange 203, while the ferrule 202 comprises a male flange 204. The female flange 203 comprises, on the distal face thereof 203$d$, an axial extension 205, with, proximate to the distal face 203$d$, a centering surface 205$c$ with a determined inner diameter. The male flange 204 has an external diameter such that it can be axially introduced into a space 206 bound by the axial extension 205, until the distal face 204$d$ of the male flange 204 abuts against the distal face 203$d$ of the female flange 203. Compression axial stresses between ferrules 201, 202 could therefore be transmitted through contact between such distal faces 203$d$, 204$d$.

The external diameter of the male flange 204 and the internal diameter of the centering surface 205$c$ are substantially equal and adjusted, so that, when the distal faces 203$d$, 204$d$ of the female and male flanges 203, 204 are in contact, the male flange 204 would be interlocked in the centering surface 205$c$ with a determined clamping. Such a radial clamping of the male flange 204 acts to transmit radial stresses between ferrules 201, 202.

Figure 3:
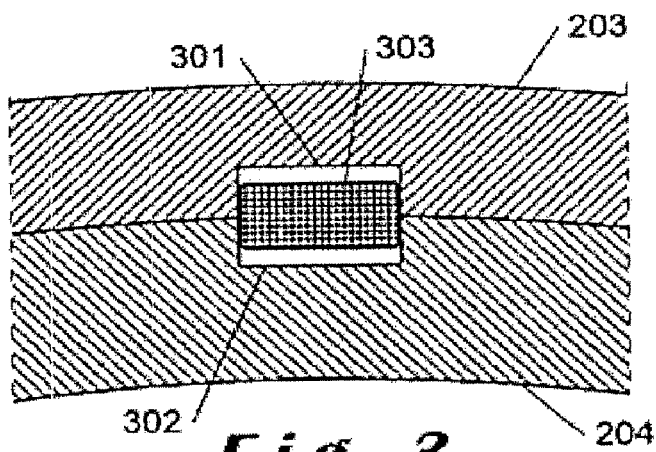
FIG. 3 is a cross sectional view of a detail of the same connecting system.

Turning to FIG. 3, each of the female and male flanges 203, 204 comprises circumferentially distributed locations 301, 302 and able to be aligned for accommodating keys 303. Each of the keys 303 is provided with a determined side clamping both in the location 301 in the female flange 203 as in the location 302 in the male flange 204. Keys 303 are provided this way for transmitting torsion circumferential stresses between ferrules 201, 202, able to have a working section substantially higher than that of the bolts 107 of the previous connecting system illustrated in FIG. 1 without requiring to broaden the diameter of the flanges 203, 204. However, transmission means different from torsion circumferential stresses between ferrules 201, 202 could be contemplated, such as for example complementary radial crenelations on flanges 203, 204.

Turning now to FIG. 2, the axial extension 205 comprises at its end 207 an inward directed radial projection 208 and forming a tapered surface 209 opposite the space 206. The male flange 204 also comprises on the proximal face thereof 204$p$, a radial surface 210 substantially opposite the tapered surface 209. A trim 211 comprises substantially tapered surfaces 211$a$, 211$b$ respectively adapted to cooperate with surfaces 209, 210 for allowing for an axial and radial shift of the trim 211 when it is being mounted. The trim 211 is introduced behind the male flange 204 into the space 205 and clamped between surfaces 209 and 210. In order to facilitate such an introduction, the trim 211 could comprise a plurality of separated sections, each intended to be introduced in the arc comprised between two keys 303.

The connecting system further comprises a trim-clamping element 212 comprising a tapered surface 213 intended to be slided is under the trim 211 clamped between surfaces 209, 210. The trim 211 has an internal tapered surface 211$c$ with the same angle as the tapered surface 213. The trim-clamping element 212 is connected by at least one screw 214 to at least one hole 215 in the female flange 203. The hole 215 has an inner thread complementary to the external thread of the stem 216 of the screw 214. By clamping screws 214, the trim-clamping element 212 is therefore axially pushed into the space 206. Because of such an axial shift, the tapered surface 213 of the trim-clamping element 212, cooperating with the internal tapered surface 211$c$ of the trim 211, shifts the trim 211 radially outward, clamping it more deeply between surfaces 209, 210, and therefore, axially spreading such surfaces 209, 210 one from the other. Such an axial spreading of surfaces 209, 210 more strongly clamps the distal faces 203$d$, 204$d$ of flanges 203, 204 one against the other. By clamping the screws 214, a compression axial prestress can therefore be exerted between flanges 203, 204. Once the connecting system is clamped with screws 214, the tensile axial stresses between ferrules 201, 202 will be thus transmitted in compression between surfaces 209, 210 through the trim 211. Screws 214, that are not directly implied for the transmission of any of the stresses transmitted between ferrules 201, 202, could be sized with a much smaller working section than that of the bolts 107 of the previous connecting system illustrated in FIG. 1.

Figure 4:
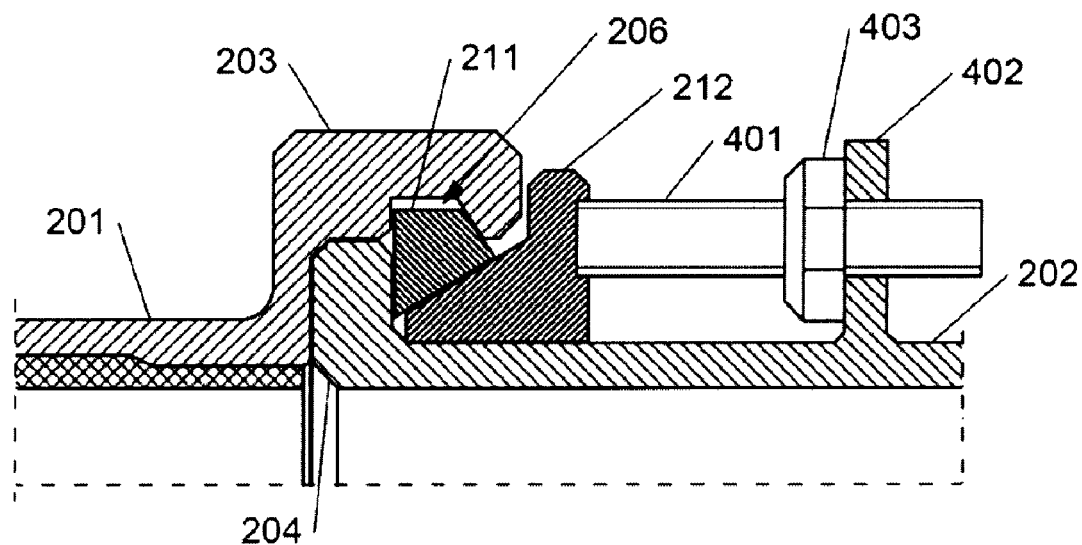
FIG. 4 is lengthwise sectional view of a connecting system according an alternative embodiment.

According to an alternative embodiment represented in FIG. 4, the trim-clamping element 212 could be connected by at least one threaded stem 401, not to the female flange 203, but to a third flange 402 integral with the ferrule 202, either by at least one complementary threaded hole directly opened in the third flange 402, or, as illustrated in FIG. 4, by a rivet nut 403. As in the first hereinabove described embodiment, the connecting system could then be clamped by rotating said threaded stem 401 relatively to the rivet nut 403, so as to make the trim-clamping element 212 progress into the space 206.

Figure 5:
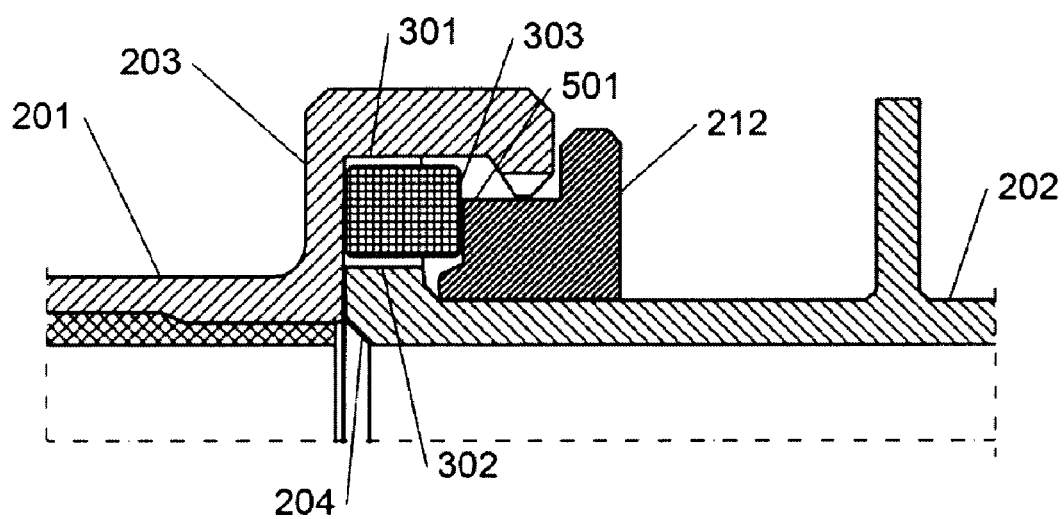
FIG. 5 represents a second lengthwise sectional view of the same connecting system.

In FIG. 5, there is illustrated a lengthwise sectional view of the same connecting system in FIG. 4 in an angularly shifted radial plane relatively to that of FIG. 4, so as to show a key 303 housed in locations 301, 302 respectively provided in the female flange 203 and the male flange 204 in order to transmit circumferential stresses therebetween. The trim-clamping element 212 has a local axial shoulder 501 intended to prevent the key 303 from being lost when the connecting system is loosened.

Although the present invention has been described referring to specific exemplary embodiments, it is obvious that various modifications and changes could be implemented on such examples, without departing from the general scope of the invention, such as defined by the claims. Consequently, the description and the drawings should be considered as being illustrative rather than descriptive.

Figure Legends

101: Ferrule
102: Ferrule
103: Flange
103p: Proximal face
103d: Distal face
104: Flange
104p: Proximal face
104d: Distal face
105: Hole
106: Hole
107: Screw
108: Nut
109: Centering surfaces
201: Ferrule
202: Ferrule
203: Female flange
203p: Proximal face
203d: Distal face
204: Male flange
204p: Proximal face
204d: Distal face
205: Axial extension
205c: Centering surface
206: Space
207: End
208: Radial projection
209: Tapered surface
210: Surface
211: Trim
211a: Tapered surface
211b: Surface
211c: Lower tapered surface
212: Trim-clamping element
213: Tapered surface
214: Screw
215: Hole
216: Threaded stem
301: Location
302: Location
303: Key
401: Threaded stem
402: Third flange
403: Rivet nut
501: Axial shoulder

The invention claimed is:

1. A connecting system for connecting two substantially tubular members of an axial compressor case, comprising :
    a) two flanges, each being substantially annular and comprising a proximal face intended to be integral with one of the two substantially tubular members and a distal face; and
    b) securing members for pressing distal faces of both flanges one against the other, so as to be able to transmit tensile and compression axial stresses between both flanges, wherein
    c) one of both flanges is a male flange with a determined external diameter,
    d) the other of both flanges is a female flange comprising, on the distal face thereof, an axial extension with an internal diameter equal to or higher than the external diameter of the male flange, such that said male flange could be introduced into a space bound by said axial extension of said female flange,
    e) said securing members comprise a trim intended for being introduced behind said male flange into the space bound by said axial extension, and a trim-clamping element intended to exert a radial force on said trim, and
    f) said trim is arranged so as to be clamped by said radial force between the proximal face of the male flange and a surface of said axial extension substantially opposite said proximal face of the male flange, so as to convert said radial force into a substantially axial spreading force between said axial extension surface and said proximal face of the male flange, by clamping distal faces of both flanges one against the other.

2. The connecting system, according to claim 1, wherein said axial extension further comprises an internal centering surface with a diameter substantially equal to the external diameter of the male flange and adjusted so as to obtain a determined radial clamping, said centering internal surface configured to cooperate with the male flange when the distal face of the latter is clamped against the distal face of the female flange, so as to limit the radial shift of the male flange relative to the female flange.

3. The connecting system according to claim 1, wherein said trim comprises a plurality of separated sectors.

4. The connecting system according to claim 1, further comprising positive connection means for ensuring circumferential stresses between the male and female flanges.

5. The connecting system according to claim 4, wherein said positive connection means comprise a set of locations provided in each of said female and male flanges and a set of keys provided for being housed in such locations.

6. The connecting system according to claim 5, wherein said locations provided in said female and male flanges are circumferentially distributed with gaps substantially corresponding to lengths of trim sectors, and each of said trim sectors is configured to be introduced into the space bound by said axial extension between two keys housed in said locations.

7. The connecting system according to any one of claim 5 or 6, wherein said trim-clamping element comprises at least one shoulder for preventing the keys to be lost, should some loosening or break occur.

8. The connecting system according to claim 1, wherein said trim-clamping element comprises a tapered or tilted surface provided for cooperating with said trim so as to convert a substantially axial force exerted on said trim-clamping element into a substantially radial force on said trim for clamping the connecting system.

9. The connecting system according to claim 8, wherein said securing members further comprise a threaded stem for connecting said trim-clamping element to a support member integral with one of both substantially tubular members, and exert said substantially axial force on said trim-clamping element so as to clamp the connecting system through rotation of said threaded stem relative to a complementary thread on the trim-clamping element or the support member.

10. An axial compressor case of a turbojet or a turboprop, comprising a plurality of ferrules, two of the plurality of ferrules are adjacent and connected by the connecting system according to claim 1.

11. The axial compressor case according to claim 10, wherein at least one of said two adjacent ferrules comprises a stator and/or an abradable inner surface.

12. A method of connecting at least two adjacent ferrules of an axial compressor case of a turbojet or a turboprop, comprising:

utilizing the connecting system according to claim 1.

13. The method according to claim 12, wherein at least one of said at least two adjacent ferrules comprises a stator and/or an abradable inner surface.

* * * * *